United States Patent
Ayo et al.

(10) Patent No.: US 6,679,806 B2
(45) Date of Patent: Jan. 20, 2004

(54) SOFT SHIFT SYSTEM AND METHOD

(75) Inventors: Grant William Ayo, Houston, TX (US); David Eric Hanson, Katy, TX (US); Barry Joe Beadle, Sprint, TX (US); Anthony Allen Giacobbe, Spring, TX (US); Mark Alan Payne, Houston, TX (US)

(73) Assignee: S & S Trust, Commerce City, CO (US)

( * ) Notice: Subject to any disclaimer, the term of this patent is extended or adjusted under 35 U.S.C. 154(b) by 0 days.

(21) Appl. No.: 10/038,132

(22) Filed: Jan. 3, 2002

(65) Prior Publication Data
US 2002/0087257 A1 Jul. 4, 2002

Related U.S. Application Data

(60) Provisional application No. 60/259,484, filed on Jan. 3, 2001.

(51) Int. Cl.[7] .......................... F16H 61/38; B60K 41/02
(52) U.S. Cl. .......................... 477/54; 477/63; 477/110
(58) Field of Search .............................. 477/54, 62, 63, 477/64, 110

(56) References Cited

U.S. PATENT DOCUMENTS

| | | | | |
|---|---|---|---|---|
| 4,495,576 A | * | 1/1985 | Ito ........................... | 477/63 X |
| 4,848,189 A | * | 7/1989 | Simon et al. ................... | 477/96 |
| 4,853,857 A | * | 8/1989 | Oshiage et al. ................ | 477/43 |
| 4,858,499 A | * | 8/1989 | Ito et al. ........................ | 477/63 |
| 5,101,786 A | * | 4/1992 | Kamio et al. ........... | 477/111 X |
| 5,319,559 A | * | 6/1994 | Kusaka et al. ............. | 477/63 X |
| 5,441,464 A | * | 8/1995 | Markyvech .............. | 477/110 X |
| 5,474,506 A | * | 12/1995 | Palansky et al. .............. | 477/63 |
| 5,573,473 A | * | 11/1996 | Asayama et al. .............. | 477/63 |
| 5,700,227 A | * | 12/1997 | Kosik et al. ................. | 477/171 |
| 5,974,354 A | * | 10/1999 | Janecke et al. .......... | 477/124 X |
| 5,974,906 A | * | 11/1999 | Stine et al. ............. | 477/124 X |
| 5,975,262 A | * | 11/1999 | Saito et al. ................ | 477/63 X |
| 6,272,414 B1 | * | 8/2001 | Takahashi et al. ............. | 701/54 |

* cited by examiner

*Primary Examiner*—Ha Ho
(74) *Attorney, Agent, or Firm*—Jenkens & Gilchrist, PC

(57) ABSTRACT

A system and method for the soft shift of a transmission connecting a power source to a well stimulation pump through a transmission. When it is desired to change gear ratios in the transmission, the transmission is caused to enter a torque converter mode from a lockup mode. The engine speed is adjusted according to a signal representative of the speed of the transmission output shaft. Once the gear ratio has been changed, the transmission is caused to enter a lockup mode from the torque converter mode.

12 Claims, 3 Drawing Sheets

SOFT SHIFT SYSTEM AND METHOD

This application claims priority from U.S. Provisional Patent Application No. 60/259,484, filed Jan. 3, 2001.

FIELD

The system and method of the present invention pertains to controlling the process by which a transmission which connects a power source and a driven device, such as a pump, changes or shifts gear ratios. More particularly, the disclosed system and method may be used for any equipment powered by an engine, a motor, or a similar device that transfers rotating power through a geared transmission mechanism to obtain a rotating power output from the transmission for use by the equipment.

BACKGROUND

In oil well stimulation, fluid is pumped into the well to increase the production of hydrocarbons from the well bore. The success or failure of a well stimulation operation depends on the ability to closely control well bore pressures and the flow rate of the stimulation fluid pumped into the well. The requirements for the control of well bore pressures and the control of the flow of stimulation fluid into the well are such that during the stimulation treatment of some oil wells, even a small reduction in the flow of stimulation fluid into the well may significantly hamper well stimulation efforts.

Given the constraint of not reducing the flow of stimulation fluid into the well, the transmission connecting the power source, such as an engine or an electric motor, to the pump for the stimulation fluid is typically shifted during high output levels of the stimulation fluid pump in prior art systems. This shifting of the transmission at high power levels is detrimental to the inner workings of the transmission. Specifically, shifting of the transmission at high power levels often results in the premature failure of the transmission due to torque spikes in the drive train elements and excessive wear on the friction elements on the power train portion of the system.

Currently, there are no systems currently available for managing the shifting or the changing of the gear ratios in the transmission in large industrial applications such as oil well stimulation.

There is therefore a need in the art for a transmission shifting system which will allow shifting at other than high power levels but, at the same time, will allow driven items, such as pumps, to maintain a substantially continuous output.

SUMMARY

The system and method of the present invention will allow shifting or changing the gear ratios in the transmission which connects a power source, such as an engine or an electric motor, and a driven device, such as a pump, at other than high power output levels without a substantial diminution of the output of the driven device.

The disclosed soft shift transmission shift and method alters the output rpm of the power source during the changing of gear ratios in the transmission to reduce wear on the gears and other transmission components. This alteration in the output rpm of the power source occurs when the driven device is decoupled from the power source such that the rpm of the power source is synchronized with the speed of the transmission output shaft as modified by the selected gear ratio. Once the synchronization of the rpm of the power source is synchronized with the speed of the transmission output shaft as modified by the selected gear ratio, the power source is re-coupled to the driven device at a lower energy value.

Operationally, the system and method of the present invention allows the transmission to enter its torque converter mode during the shift process. By allowing the transmission to enter its torque converter mode during the shift process, wear on the components within the transmission is reduced. This reduction in wear increases the serviceable life of the transmission and reduces operating costs without any substantial diminution in the performance of the driven device.

BRIEF DESCRIPTION OF THE DRAWING FIGURES

A better understanding of the soft shift system and method of the present invention may be had by reference to the drawing figures, wherein.

DESCRIPTION OF THE EMBODIMENTS

While the following description of the soft shift system and method of the present invention is centered around its use with oilfield pumping equipment, it will be understood by those of ordinary skill in the art that the system and method of the present invention may be used in a wide variety of other applications which include a prime mover or large power source, a power transmission device with gear ratio selection capability, and a driven device or component.

Figure 1:
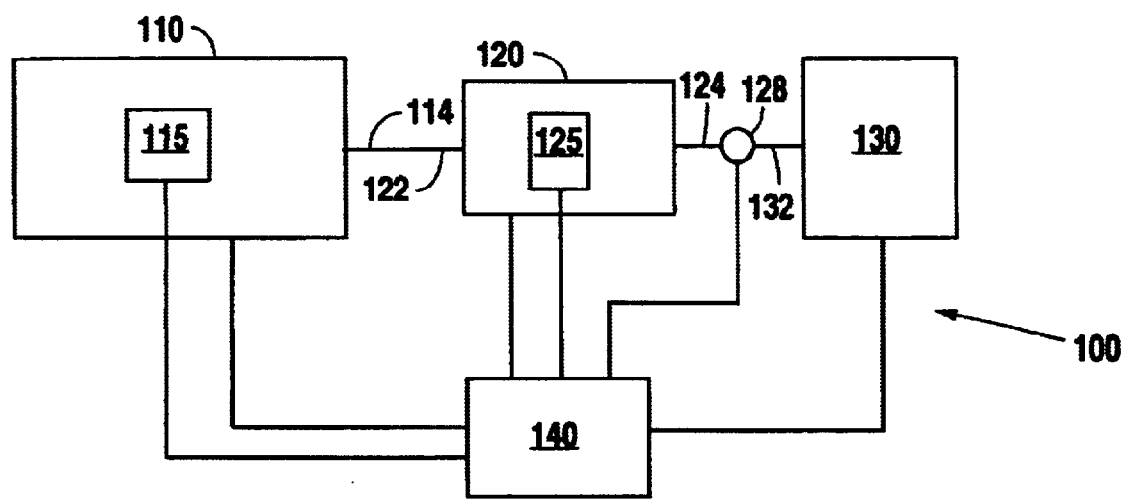
FIG. 1 is a schematic drawing of an engine-transmission-pump set typically used for pumping well stimulation fluids.

As shown in FIG. 1, the preferred embodiment of the soft shift system 100 includes a prime mover 110 with a variable electronic or mechanical speed control 115. Typically, this prime mover is an internal combustion engine. In oilfield applications the internal combustion is often a diesel engine capable of producing over 1300 BHP. Mechanically connected to the prime mover is a power transmission device with gear ratio selection capability 120, which, in turn, is mechanically connected to a driven device or component, typically a pump 130 for inserting stimulation fluid into the well. Selection of different transmission gear ratios results in different pump rates. The transmission is typically of the automatic type, with either an electric valve body or its own electronic shift control system 125. Operation of the entire system, the power source, the transmission, and the pump, is typically governed by a microprocessor based control system or controller 140.

Figure 2:
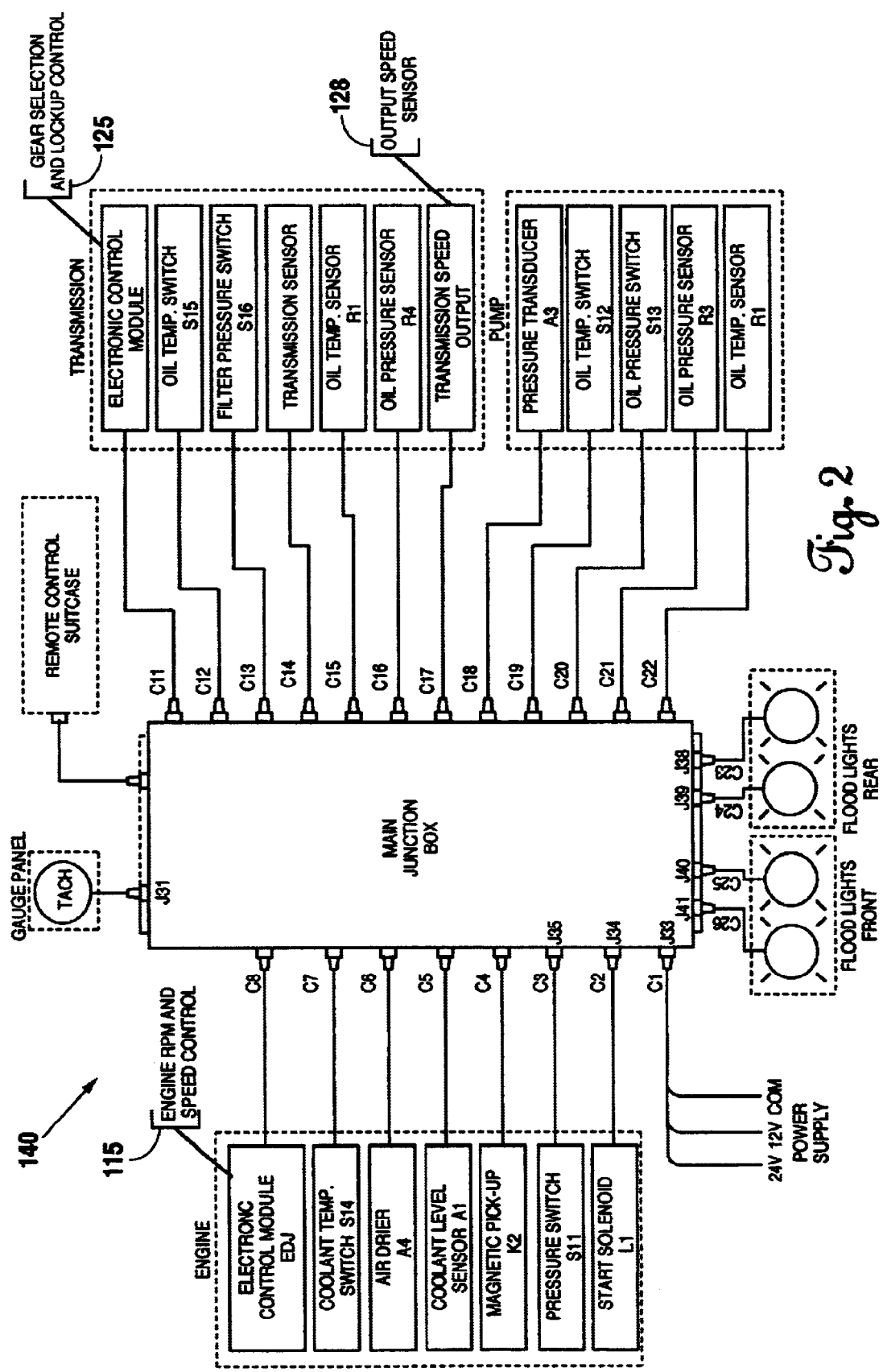
FIG. 2 is a schematic of a control system for the engine-transmission-pump set shown in FIG. 1.

As shown in FIG. 2, the controller 140 monitors and controls a wide variety of operational parameters of the engine-transmission-pump set. Key to the present invention are the transmission output shaft speed sensor 128, gear selection and lockup control 125, and engine rpm and speed control 115.

The connection between the transmission 120 and the engine 110 is typically through a direct coupling between the output shaft 114 of the engine 110 and the input shaft 122 of the transmission 120. The driven input shaft 132 of the well stimulation fluid pump 130 is connected to the output shaft 124 of the transmission 120.

The controller 140 receives information on the operation of the entire pump system through a variety of switches and transducers which are connected to the engine 110, the transmission 120 and the pump 130. Using this information on system operation, the controller 140 will provide the necessary electrical and electromechanical signals which are used to regulate the operation of the engine 110, the transmission 120, and the pump 130. Specifically, the controller 140 has the ability to cause the speed of the engine to vary in conjunction with the process of changing the gear ratios within the transmission based on the feedback of the condition of the lockup status of the transmission.

According to the present invention, the shift sequence of the transmission 120 includes the following described series of events. First, a shift signal is received by the gear selection and lockup control 125 from the controller 140. This shift signal causes the transmission 120 to release a mechanical coupling between its input and output shafts thus exiting the lockup mode and entering a mode known as the torque converter mode. While the transmission 120 is in the torque converter mode, the gear set required for the desired gear ratio will be mechanically moved into proper position within the transmission 120. Once the gear set is moved into place, the mechanical coupling of the input shaft 122 of the transmission 120 to the output shaft 124 of the transmission 120 will be engaged. The engagement of the mechanical coupling will cause the transmission to exit the torque converter mode and enter the lock up mode at the selected gear ratio (GR).

The limitations of the shift of the transmission 120 and operation of the stimulation fluid pump 130 exist during the time interval (Tconv) that the transmission 120 is in for the torque converter mode. These limitations affect the energy absorbed by the components of the transmission 120 during the transfer from the torque converter mode to the lock up mode. In addition, these limitations affect the ability of the engine 110 to resume operation against the process load of the stimulation fluid pump 130. The energies absorbed by the transmission 120 are the torsional stress (Etors) on the gear shafts and in the frictional loss (Efric) on clutch plates. The time limitation on the act of shifting or changing the gear ratios in the transmission 120 must be short enough to not affect the ability of the engine 110 to recover operation after the shifting of the gear ratios and to supply torque to the rotating components and overcome the force needed to continuously move the well stimulation fluid through the stimulation fluid pump 130. When a diesel internal combustion engine is used, there is an additional limitation. Specifically, the engine rpm must not drop below a level where there is a dramatic decrease in the torque output of the diesel engine. Therefore, particularly where a diesel engine is used, the engine speed or rpm (Es) must remain above a threshold level (RPMmin).

In the preferred embodiment, the system and method of the present invention will cause the controller 140 to send a signal to the engine rpm and speed control 115 to alter the engine speed or rpm to a level that is equivalent to ratio of the gear set selected within the transmission and the output shaft speed, which is greater than (RPMmin), during the shift sequence. This alteration of the engine speed or rpm will occur during a time interval (Tss) which is initiated prior to the engagement of the gears within the transmission and which time interval (Tss) is terminated after synchronization of the meshing gears is achieved and the set of gears providing the new gear ratio is in position. Synchronization of the meshing gears is considered to be at a calculated, desired engine speed (Es) at which the transmission output shaft speed or rpm (Ss) is within a predetermined range of a percentile (X%) of the transmission output shaft speed (Ss) multiplied by the gear ratio (GR). This engine speed Es is determined according to the following expression:

$$Es. \; Ss*GR \pm X\%$$

During the time interval (Tss) when the gear ratios within the transmission are being changed, the speed or rpm of the engine and its power output capabilities will be altered. This alteration will adjust the amount of power supplied to the input shaft 122 of the transmission 120. In addition, the energies required by the stimulation fluid pump 130 will reduce the inertia of the moving pump components and the transmission output components. As the operational requirements of the engine 110, the transmission 120, and the pump 130 are affected, the system and method of the present invention allows the controller 140 to synchronize the speed of the input shaft 122 of the transmission 120 to the output shaft 124 speed of the transmission 120 to reduce the shock load on the transmission 120 components typically encountered when the engine 110 is mechanically coupled through the transmission 120 to the stimulation fluid pump 130.

Once the components within the transmission 120 producing the desired gear ratio are in place and synchronization is achieved, the system and method of the present invention will cause the controller 140 to instruct the transmission shift system to exit the torque converter mode and establish the mechanical coupling between the input shaft of the transmission and its output shaft. This exiting of the torque converter mode and establishing the mechanical coupling will be done within the constraint that Tss will not be greater than Tconv but will be greater than the time period required for the gears (Tgears) to shift into the position required for the desired gear ratio within the transmission. Specifically:

$$Tgears < Tss \# Tconv$$

Figure 3:
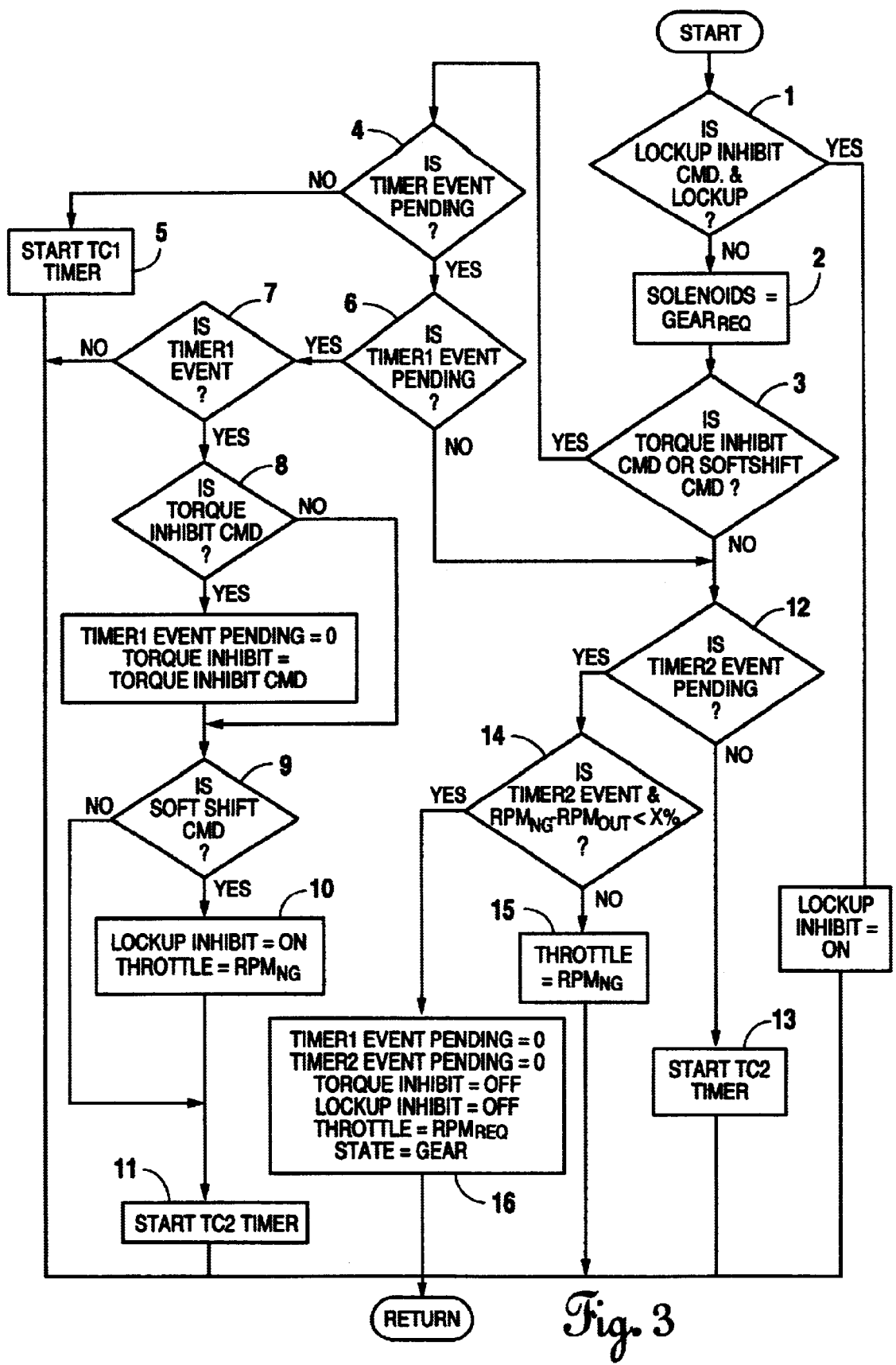
FIG. 3 is a logic diagram of the soft shift system and method of the present invention.

The logic control system incorporated into the disclosed system and method is depicted in FIG. 3. Therein, it may be seen that the control loop is a recursive loop used to control the timing sequence of the gear change once the system has received the command to change the gear selection. The loop is entered at the Start block at the onset of the shift indication from the operator. All movements and timing of the sequence are handled within the Gear Change Logic loop.

The loop begins in step 1 to allow the operator to inhibit lockup before the shift sequence is initiated. Once lockup is released or the Lockup inhibit command is relinquished, the system moves to change the gear solenoids selected in step 2 to the required gear ($Gear_{req}$). With the required gear solenoids activated, the system checks for the requirement of the Soft Shift Command or the Torque Inhibit Command. If either is required, the system will check for pending shift delay timers in step 4 to note whether the shift request was initiated prior to this iteration of the control loop or if this iteration is the first for a new gear change. For a new gear change, the system will start the first delay timer (TC1) in step 5. If TC1 is active already, then its status will be checked in steps 6 and 7. Step 7 determining if the timer has expired and upon its expiration activating the additional control loop functions in step 8 and step 10. Step 8 is designated to activate the torque inhibit functions. Step 10 activates the soft shift function by activating the lockup inhibit and sets the engine throttle to the calculated speed ($RPM_{NG}$). Where $RPM_{NG}$ is calculated based on the differential between the engine speed (RPM) and the transmission output speed multiplied by the required gear ratio ($RPM_{OUT}$). Then begins the second delay timer (TC2) in step 11. Once TC2 is started, the control loop will step through to step 12. With TC2 pending completion, the control loop will flow through step 14 to step 15, which calculates a new setting for $RPM_{NG}$. Step 14 will move to complete the gear change sequence once TC2 has expired and the difference between $RPM_{NG}$ and $RPM_{OUT}$ is within the desired limitations. Completion of the gear change is in step 16 where the system flags are set off and the engine speed is set to achieve the desired output sped ($RPM_{REQ}$).

The disclosed system differs from prior art systems where the operation of the transmission 120 is altered during the transition from lock up mode to the torque converter mode. Damage to the drive train and gearing within the transmission then occurs when the transmission 120 is returned to the lock up mode from the torque converter mode. Additionally, in prior art systems, external control of the lock up mode is not predictable. This lack of predictability affects the inner workings of the transmission 120.

In other applications the system and method of the present invention may be used for the control of two speed gearboxes and other rotational speed alteration devices which are typically installed in the drive line to a driven device.

While the system and method of the present invention has been described by reference to its preferred and alternate embodiments, those of ordinary skill in that art will understand that other embodiments of the present invention have also been enabled. Such other embodiments shall be included within the scope and meaning of the appended claims.

What is claimed is:

1. A system for changing the gear ratios in a transmission portion of an engine, the transmission driving an oil well stimulation pump, said system comprising:
    a rotational speed sensor for determining the rotational speed of an output shaft of the transmission;
    means for calculating a desired rotational speed for the engine using the output of said rotational speed sensor;
    means for using said desired rotational speed of the engine to regulate the actual rotational speed of the engine;
    means for causing the transmission to enter a torque converter mode;
    means for changing the gear ratios in the transmission;
    means for causing the transmission to enter a lockup mode;
    whereby when it is desired to actuate said means for changing the gear ratios in the transmission, said means for causing the transmission to enter the torque converter mode is activated, then the rotational speed of the engine is adjusted to said desired engine speed, and thereafter said means for causing the transmission to enter the lockup mode is activated.

2. The system as defined in claim 1 wherein said desired rotational speed of the engine is calculated according to the following relationship:

$$Es=Ss*GR\pm X\%$$

wherein Es is the desired rotational speed of the engine, Ss is the rotational speed of the output shaft of the transmission, GR is the gear ratio, and X is a predetermined number.

3. The system as defined in claim 1 wherein the rotational speed of the engine is not allowed to fall below a predetermined value.

4. The system as defined in claim 1 wherein the rotational speed of the engine is not allowed to attain a level below which the engine cannot resume operation of the oil well stimulation pump.

5. A method for shift shifting gear ratios in a transmission which transmits power between a power source and an oil well stimulation pump, said method comprising the steps of:
    using a controller to sense the operating characteristics of the power source, the transmission, and the oil well stimulation pump;
    using said controller to regulate the rotational speed of the power source and to shift the gear ratios in the transmission;
    sending a signal from said controller to the transmission which causes the transmission to exit a lockup mode and enter a torque converter mode;
    sending a signal from said controller to the transmission which causes the gear ratios in the transmission to change;
    adjusting the rotational speed of the power source;
    sending a signal from said controller to the transmission which causes the transmission to exit said torque converter mode and enter said lockup mode.

6. The method as defined in claim 5 wherein the rotational speed of the power source is adjusted according to the following relationship:

$$Es=Ss*GR\pm X\%$$

wherein: Es is the rotational speed of the power source, Ss is the rotational speed of the oil well stimulation pump, GR is the gear ratio, and X is a predetermined number.

7. The method as defined in claim 5 wherein said rotational speed of the power source is not allowed to fall below a predetermined value.

8. The method as defined in claim 5 wherein said rotational speed of the power source is not allowed to fall below a level at which it cannot resume operation of the oil well stimulation pump.

9. An oil well stimulation system comprising:
    an engine for producing rotational power;
    a transmission mechanically connected to said engine for adjusting said rotational power produced by said engine and producing rotational power;
    a stimulation fluid pump mechanically connected to an output shaft of said transmission for receiving rotational power;
    a controller for sensing the operational characteristics of said engine, said transmission, and said stimulation fluid pump;
    a rotational speed sensor for determining the rotational speed of the power input to the stimulation fluid pump;
    means for calculating a desired rotational speed for said engine using said rotational speed sensed by said rotational speed sensor on the power input to the stimulation fluid pump;
    means for using said desired rotational speed for said engine to regulate the actual rotational speed of said engine;
    means for causing said transmission to enter a torque converter mode;

means for changing the gear ratios in said transmission;

means for causing said transmission to enter a lockup mode;

whereby when it is desired to shift or change the gear ratios in said transmission, said transmission is first caused to enter the torque converter mode, then the rotational speed of said engine is adjusted to said desired rotational speed of said engine, and said transmission is caused to enter the lockup mode.

10. The well stimulation system as defined in claim 9 wherein said rotational speed of said engine is adjusted according to the following relationship:

$$Es = Ss * GR \pm X\%$$

wherein: Es is the desired rotational speed of said engine, Ss is the rotational speed of the output shaft of said transmission, GR is the gear ratio, and X is a predetermined number.

11. The oil well stimulation system as defined in claim 9 wherein said rotational speed of said engine is not allowed to fall below a predetermined value.

12. The oil well stimulation system as defined in claim 9 wherein said rotational speed of said engine is not allowed to drop to a level below which it cannot resume operation of said stimulation fluid pump.

* * * * *